(12) United States Patent
Tarasinski et al.

(10) Patent No.: US 6,933,691 B2
(45) Date of Patent: Aug. 23, 2005

(54) CONTROL SYSTEM FOR A SHIFTING MECHANISM WITH A DC MOTOR

(75) Inventors: Nicolai Tarasinski, Frankenthal (DE); Norbert Fritz, Mannheim (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/439,510

(22) Filed: May 16, 2003

(65) Prior Publication Data

US 2004/0021438 A1 Feb. 5, 2004

(30) Foreign Application Priority Data

Jun. 13, 2002 (DE) .......................... 102 26 152

(51) Int. Cl.[7] .............................. H02K 7/10; F16H 48/00
(52) U.S. Cl. ...................... 318/293; 318/12; 318/10; 318/439; 318/599; 475/12; 475/149
(58) Field of Search .................... 318/10–15, 560, 318/610, 632, 650, 696, 685, 671, 672, 375–379, 254–258, 280, 293, 466–470; 388/819, 907.2, 804, 811; 475/12, 149

(56) References Cited

U.S. PATENT DOCUMENTS

| | | | | |
|---|---|---|---|---|
| 3,525,883 A | * | 8/1970 | Iordanidis | 318/599 |
| 4,319,171 A | * | 3/1982 | Motoori | 318/379 |
| 4,544,869 A | * | 10/1985 | Pittaway | 318/293 |
| 4,545,004 A | * | 10/1985 | Kade et al. | 318/293 |
| 4,901,366 A |   | 2/1990 | Rottger | 388/811 |
| 5,481,170 A | * | 1/1996 | Edelen et al. | 318/650 |
| 5,666,035 A | * | 9/1997 | Basire et al. | 318/254 |
| 5,760,555 A | * | 6/1998 | Yamano et al. | 318/293 |
| 5,801,504 A | * | 9/1998 | Endo et al. | 318/434 |
| 5,818,178 A | * | 10/1998 | Marumoto et al. | 318/254 |
| 5,894,208 A | * | 4/1999 | Davis et al. | 318/484 |
| 6,098,594 A | * | 8/2000 | Kowatari et al. | 123/399 |
| 6,680,598 B2 | * | 1/2004 | Galbiati et al. | 318/717 |
| 6,683,437 B2 | * | 1/2004 | Tierling | 318/811 |

FOREIGN PATENT DOCUMENTS

| | | |
|---|---|---|
| DE | 1 513 181 | 10/1969 |
| DE | 30 27 729 | 2/1981 |
| DE | 0 126 988 | 12/1984 |

* cited by examiner

*Primary Examiner*—Marlon T. Fletcher
*Assistant Examiner*—Eduardo Colon Santana

(57) ABSTRACT

A control system controls a DC motor which operates a shifting mechanism. The control system includes switch circuit with a plurality of switches which connect terminals of the motor to a power supply. In order to limit the speed and torque, the control system operates the DC motor via pulse-width modulation so that the DC motor is alternately operated in a supply mode and in a short-circuit mode. The alternating supply and short-circuit modes result in operating states in which the motor is alternately driven and decelerated. Consequently, the speed and torque of the DC motor can be limited by the pulse-width modulation of control signals.

7 Claims, 4 Drawing Sheets

CONTROL SYSTEM FOR A SHIFTING MECHANISM WITH A DC MOTOR

BACKGROUND

The present invention relates to a control system for driving a DC motor which operates a shifting mechanism.

It is known to use electric motors to actuate shifting mechanisms. For example, there are shifting mechanisms for manual transmissions which are actuated automatically by electric motors. In order to prevent overloading of the shifting mechanism, the shifting force during the shifting process must be restricted. The shifting force is usually limited in such shifting mechanisms by incorporating elastic elements that absorb the excess forces into the power train and/or by using, for example, force or position sensors for limiting the electric current applied to the motor.

A method and device for controlling the shifting force in an automatic mechanical transmission is disclosed in U.S. Pat. No. 5,481,170. In this system an electric motor is controlled via pulse-width modulation by a control unit. The control unit controls or regulates the duty cycle of a pulse-width modulated (PWM) voltage signal that is altered and adapted as a function of predetermined limit values. For example, the current is monitored during the shifting process and compared with a permissible target current value in order to avoid excessive current fluctuations. With this system it is possible to limit and monitor the torque of a DC motor which generates the shifting force so as to prevent mechanical overload of components of the shifting mechanism. However, the method described in U.S. Pat. No. 5,481,170 requires that the current be sensed so that the sensed current signal can be used in the control process. This increases the cost and complexity of the system.

EP 0 126 988 A1 discloses a control circuit for regulating the speed of a DC motor. The control circuit includes a speed regulating component that generates a pulse-width modulated control signal as a function of a speed sensor, i.e., as a function of the motor speed, and a predetermined nominal speed. This control signal is used to control a transistor switching bridge circuit which drives the DC motor. The speed sensor generates a signal that is proportional to the speed of the DC motor. This signal is used for changing the duty cycle of a pulse-width modulated control signal for the transistor switching bridge of the DC motor. The DC motor is alternately supplied with positive and negative current in accordance with the duty cycle of the control signal so that the DC motor is actively alternately accelerated and decelerated. The active deceleration, i.e., supplying the DC motor with current opposite to the rotational movement, should also make it possible to control the speed and rapidly to decelerate the motor at low speeds. The transistor switching bridge circuit has a conventional design. Four transistors are arranged between the terminals of a voltage supply and the DC motor in the form of a bridge circuit. The transistors are switched in such a way that the two sets of the diametrically opposite transistors of the bridge circuit are respectively switched to the conductive and non-conductive state. Thus, two current paths for supplying the DC motor are realized, where the current flows through these current paths alternately and in opposite directions. These current paths are controlled by two control transistors, the collectors of which are respectively connected to the bases of two transistors of the bridge circuit. The pulse-width modulated control signal generated by the speed-regulating component is applied to the bases of the control transistors. If one of the two control transistors is switched to the conductive state, the current flows through the DC motor along one of the current paths of the transistor switching bridge. The motor is alternately driven in one direction of rotation and in the other direction of rotation due to the pulse-width modulated, alternate switching of the control transistors. Depending on the pulse-width ratio, the drive of the DC motor predominates in one direction of rotation so that the speed of the motor can be controlled.

The control circuit of EP 0 126 988 A1 has two controllable current paths that are alternately triggered in order to operate the DC motor. However, the regulation of the speed is complex and costly, since additional components are required, such as a speed sensor and a logic unit for the signal logic operation.

The above described methods and devices are unable to limit both the torque and the speed of a DC motor.

SUMMARY

Accordingly, an object of this invention is to provide a simple control system for controlling a DC motor in a shifting mechanism.

A further object of the invention is to provide an inexpensive control system for controlling a DC motor in a shifting mechanism.

A further object of the invention is to provide such a control system which does not exceed a predetermined nominal speed and a predetermined torque of the DC motor.

A further object of the invention is to provide such a system which does not require sensors or devices for sensing the position of the control lever position, the speed of the DC motor or the force applied to the shift links of the shift lever mechanism, and which does not require any device for limiting the current of the DC motor.

A further object of the invention is to provide such a system which does not require sensors or devices for measuring the control lever position or the speed or the power of the DC motor, and no device for limiting the current of the DC motor is required.

A further object of the invention is to provide such a system wherein the shifting process take place as rapidly as possible without causing damage when limit stops are reached at high speeds.

A further object of the invention is to provide such a system which eliminates the need for limiting the power with additional elastic elements in the shifting mechanism.

A further object of the invention is to provide such a system which minimizes the shifting times and optimizes the actuating speed of the shifting mechanism while observing the stress limits of the mechanical elements of the shifting mechanism.

These and other objects are achieved by the present invention wherein a control system includes switch circuit which alternately connects the terminals of a DC motor to a power supply during a supply mode and which short-circuits the terminals during a short-circuit mode within one switching cycle. The alternating supply and short-circuit modes alternately drive and slow down the motor. A pulse-width modulated control signal for triggering the switches causes the DC motor to be alternately accelerated and decelerated such that a state of equilibrium is achieved in which a predetermined nominal speed, and a predetermined torque, are adjusted. During the supply mode, the DC motor is driven by a power supply. The subsequent short-circuit mode initially causes the current to flow through the DC motor in the same direction but at decreased magnitude. Thus, the DC motor continues to be driven. Once the point at which the electromotive force of the DC motor predominates is reached, the current reverses and the DC motor acts like a generator. In this mode, the DC motor is significantly decelerated by the short-circuit current. Once the control system switches back to the supply mode, initially, the current continues to flow through the DC motor in the same direction and is fed back to the power supply, i.e., a brief current recovery takes place. In other words, part of the kinetic mechanical energy contained in the system can be converted back into electrical energy and fed to the power supply by changing over from the short-circuit mode to the supply mode.

The nominal speed or maximum speed as well as the maximum torque of the DC motor can be controlled by varying the duty cycle of the pulse-width modulated control signal, and without the use of a complicated sensor for determining the operating parameters such as motor speed or motor current. Nominal speeds and torques can be adjusted as a function of the ratio between the length of the supply mode and the length of the short-circuit mode within a switching cycle.

The DC motor can be operated in an open mode within a time interval between the supply mode and the short-circuit mode, so that the switches of the switch circuit are simultaneously switched to a non-conductive state. This prevents voltage spikes that may occur due to the non-discrete switching processes from the supply mode to the short-circuit mode. Crossovers of undesirable switching states can be prevented by incorporating an open mode into the switching cycle.

Another advantage of the present invention is that the effect of the motor deceleration modes is less at low motor rpm. Thus, a predetermined nominal speed can be reached very rapidly from standstill. The deceleration effect caused by the short-circuit mode only occurs if the DC motor is actually turning. The deceleration effect increases proportionally with the speed of the DC motor. If the DC motor is able to turn freely without being subjected to significant torque, it is accelerated during the supply mode and decelerated with equal intensity during the short-circuit mode. This produces an equilibrium between acceleration and deceleration that can be adjusted.

The switch circuit can be triggered with variable pulse-width ratios over time during the operation of the DC motor. This makes it possible specifically to manipulate the existing operating conditions during a shifting process. For example, a high pulse-width ratio can be chosen for accelerating masses in order to reach rapid acceleration with high torque. The pulse-width ratio can then be lowered again in order to maintain a desired nominal speed. Low torques or loads can be realized in a controlled fashion with correspondingly low pulse-width ratios, even in powerful DC motors. The variation of the pulse-width ratio over time makes it possible individually to adapt the control of the DC motor to the existing conditions during the shifting process and to optimize the control of the DC motor with respect to the duration of a shifting process.

The control system may be used to control a motor in a shifting mechanism, wherein the motor is used to automate the shifting process. The control system is particularly suitable for electromotive-assisted shifting mechanisms with limited shifting paths and for shifting mechanisms in which the shifting path is limited by limit stops or the like. Shifting mechanisms of this type are used in semi-automatic transmissions, in which the shifting path is limited by a synchronizing device of the transmission and the shifting mechanism moves against a limit stop and against synchronizing rings during the synchronizing process. In order to achieve a fast shifting process, comparatively powerful shifting motors are used. Once the limit stop is reached, the shifting forces generated by the electric motor must be limited so as to prevent damage to individual components of the shifting mechanism and the synchronizing device. Additional sensors for limiting the shifting force or force-absorbing, elastic auxiliary elements are eliminated. With this shifting mechanism, it is possible to limit the shifting force by controlling the shifting mechanism in pulse-width modulated fashion.

For example, if the rotation of the DC motor is impaired because the shifting mechanism engages the synchronizing device, a force that decreases only slightly, if at all, during the short-circuit mode, builds up during the supply mode since no energy is actively withdrawn from the system during the short-circuit mode while the DC motor is at standstill. The frequency and the duration of the supply and short-circuit modes can be controlled by choosing the pulse-width ratios for controlling the control system accordingly. This makes it possible to limit the shifting forces in the shifting mechanism.

DETAILED DESCRIPTION

Figure 1:
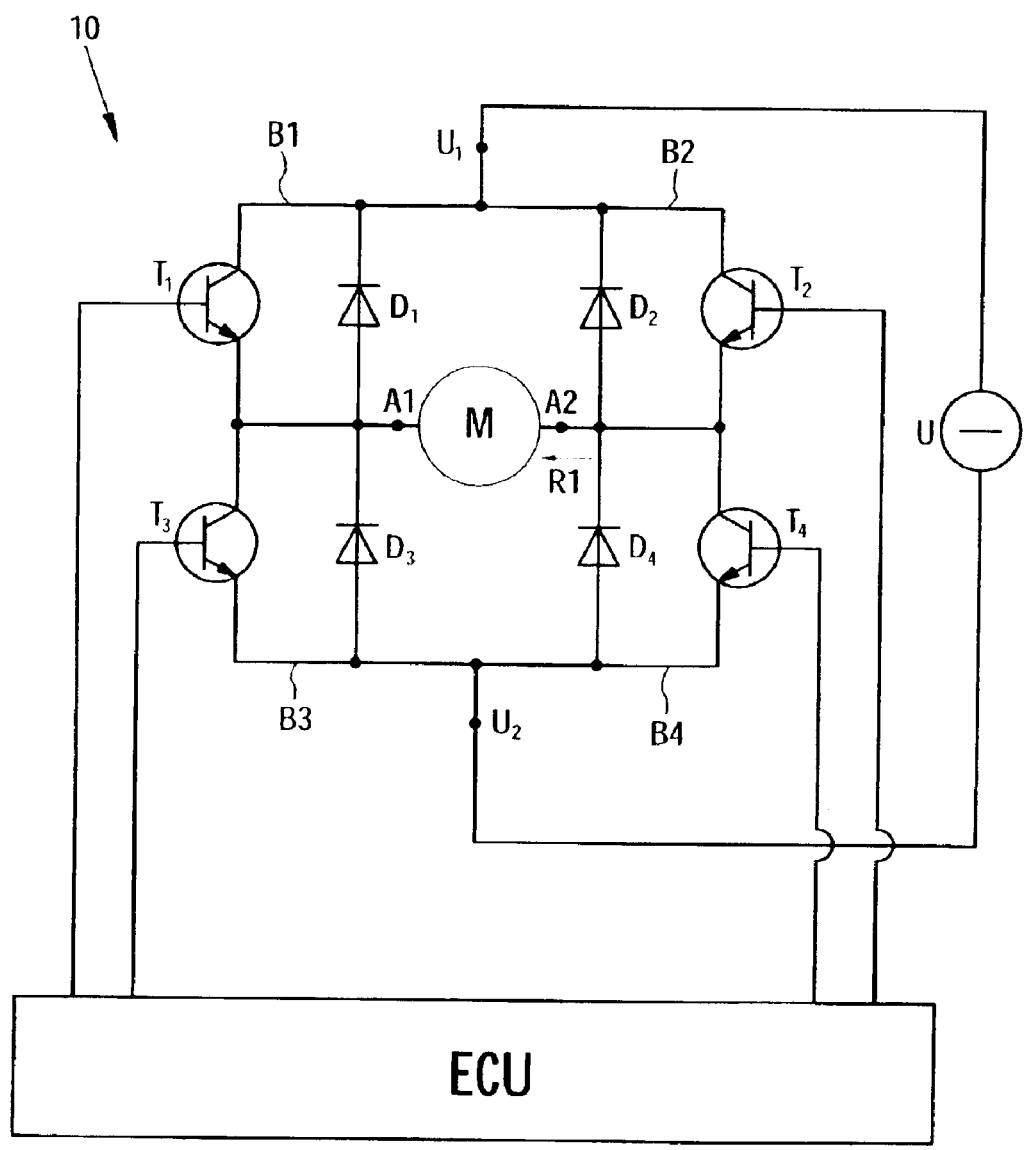
FIG. 1 is a circuit diagram of a control system for a DC motor according to the invention.

Referring to FIG. 1, a control system operates a DC motor M in both directions of rotation. The DC motor M has two terminals A1 and A2. A switch circuit includes four transistors T1–T4 and four diodes D1–D4. Two transistors T1, T3 are connected in series in a first branch between the two terminals U1, U2 of a power supply U, and two transistors T2, T4 are connected in series parallel thereto in a second branch. The polarity of all four transistors forming the bridge circuit is in the same direction. Terminals A1, A2 of the DC motor M are conductively connected to the respective central taps between the transistors T1 and T3 and between the transistors T2 and T4 of the bridge. Four diodes D1–D4 are connected parallel to the transistors T1–T4.

Each diode D1–D4 has a cathode connected to an emitter of the corresponding transistor and has an anode connected to a collector of the corresponding transistor T1–T4. In FIG. 1, the transistor T1 and the diode D1 are located in the upper left bridge branch B1. The transistor T2 and the diode D2 are located in the upper right bridge branch B2, the transistor T3 and the diode D3 are located in the lower left bridge branch B3, and the transistor T4 and the diode D4 are located in the lower right bridge branch B4. The transistors T1, T2, T3, T4 operate as switches that are conductive when a high potential is applied to the base of the respective transistor T1, T2, T3, T4 and non-conductive if a low potential is applied to the base of the respective transistor by an electronic control unit (ECU).

The direction of rotation of the motor M can be controlled by controlling the switching states of the switching circuit 10 to place the circuit in a supply mode and in a short-circuit mode. For a first direction of rotation of the DC motor M, the transistors T1 and T3 are alternately switched in a pulse-width modulated fashion, where the transistor T2 is permanently switched to the non-conductive state and the transistor T4 is permanently switched to the conductive state. For the second direction of rotation, the transistors T2 and T4 are alternately switched in a pulse-width modulated fashion, wherein the transistor T1 is permanently switched to the non-conductive state and the transistor T3 is permanently switched to the conductive state. Thus, only the transistors of one branch of the bridge circuit (longitudinal bridge branch) are controlled in opposite directions in a pulse-width modulated fashion at any time depending on the direction of rotation. It should also be noted that the two transistors of one branch (T1 and T3, T2 and T4) are never simultaneously switched to the conductive state because this would short-circuit the power supply.

Figure 2:
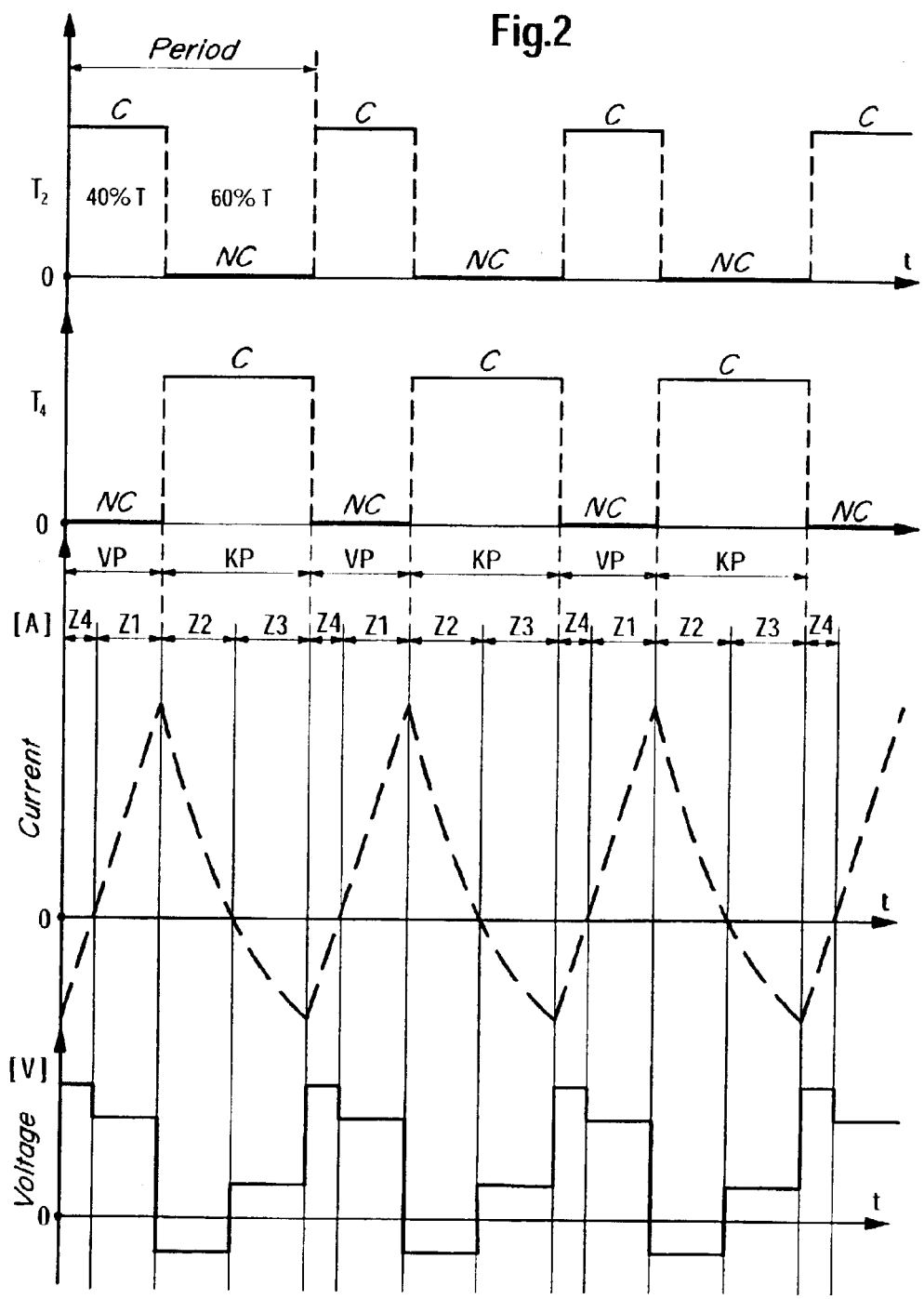
FIG. 2 is signal timing diagram showing shifting pulse signals and corresponding motor current and voltage signals.

Referring now to FIG. 2, the states Z1–Z4 result for a selected direction of rotation due to the pulse-width modulated control of the transistors of one branch of the bridge circuit, wherein said states are assigned to a supply mode VP and a short-circuit mode KP of the DC motor M.

FIG. 2 shows the control signals for the pulse-width modulated control of the transistors T2 and T4 with a pulse-width ratio of 40%, as well as the current and armature voltage signals of the DC motor M. The supply and short-circuit modes VP and KP, as well as the states Z1–Z4, are also shown in FIG. 2. The supply mode VP comprises the states Z1 and Z4, in which the transistor T2 is switched to the conductive state (C) and the transistor T4 is switched to the non-conductive state (NC). The short-circuit mode KP comprises the states Z2 and Z3, in which the transistor T2 is switched to the non-conductive state and the transistor T4 is switched to the conductive state. Thus, each switching period T comprises a supply mode VP and a short-circuit mode KP.

The state Z1 occurs when the transistor T2 is switched to the conductive state and the transistor T4 is switched to the non-conductive state. Current flows through the DC motor M from the terminal U1 in the direction R1 via the upper right bridge branch B2 and to the terminal U2 via the lower left bridge branch B3. This current generates a positive air gap moment and drives the DC motor. In the state Z1, the current rapidly increases (FIG. 2) and accelerates the DC motor M.

When switching the transistors T2 and T4, the state Z2 occurs in which the transistor T2 is switched to the non-conductive state and the transistor T4 is switched to the conductive state so that the DC motor M is operated in the short-circuit mode KP, i.e., the terminals A1, A2 of the DC motor M are short-circuited. Due to its inertia, the DC motor M continues to rotate and the inductance of the armature causes the current to continue to flow in the same direction R1, against the back emf induced by the motor windings (not shown), namely through transistor T3 which is conductive due to the lower left bridge branch B3, and to the terminal A2 through the diode D4 via the lower right bridge branch. Thus, the current flow counteracts the voltage induced in the motor windings so that the current rapidly decreases. The transistor T4 can be switched over with a slight time delay relative to the switch-over of transistor T2 because the short-circuit current initially flows through the diode D4.

The electromotive force causes a reversal of current direction. The state Z3 begins as soon as the current falls below the zero line and flows in the opposite direction. The current now flows through the transistor T4 that was switched to the conductive state via the lower right bridge branch B4 and to the terminal A1 through the diode D3 via the left lower bridge branch B3. Here, the DC motor M acts as a generator. The current and voltage signal waveforms shown in FIG. 2 indicate that the current is negative and that another voltage jump occurs. In this state, the current generates a braking moment in the DC motor M.

The supply mode VP then occurs again by again switching over the transistors T2 and T4. The transistor T2 is switched to the conductive state and the transistor T4 is switched to the non-conductive state. This produces the state Z4. The DC motor M continues to act as a generator. Since the short-circuit of the state Z3 is interrupted by the non-conductive transistor T4, the current flows in the negative direction, i.e., from the terminal U2 to the DC motor M through the diode D3 via the lower left bridge branch B3 and to the terminal U1 of the power supply U through the diode D2 via the upper right bridge branch B2. In this case, the DC motor generates a negative torque and feeds power back to the power supply U. This is possible because the induced voltage is positive and the total armature voltage is higher than the voltage of the power supply. The transistor T2 can be switched over with a slight time delay relative to the switch-over of the transistor T4 because the short-circuit current flows through the diode D2.

As shown by the current signal waveform in FIG. 2, the current decreases during state Z4 until the current direction reverses to direction R1. As shown by the voltage signal waveform in FIG. 2, the voltage level is at a maximum at the beginning of state Z4, which produces the feedback by the DC motor M. At the time that the current direction reverses to direction R1, the state Z1 occurs again and the DC motor M is actively accelerated.

As in the above-described switching states of the transistors T1 and T3 and the control of the transistors T2 and T4, the transistor T2 is permanently switched to the conductive state and the transistor T4 is permanently switched to the nonconductive state for the opposite direction of rotation of the DC motor M. The transistors T1 and T3 are now controlled in pulse-width modulated fashion.

The duration of the individual states Z1–Z4 and consequently the length of the supply mode and the short-circuit mode VP and KP can be varied and adjusted as a function of the pulse-width ratio P of the control signals for the respective transistors T2 and T4, T1 and T3. It was determined that a relatively high pulse-width ratio P makes it possible to operate the DC motor M in such a way that only the states Z1 and Z2 occur during the supply mode and the short-circuit mode VP and KP. In this case, the DC motor M is predominantly accelerated and only slightly decelerated such that a high nominal speed and a high torque can be achieved. At a relatively low pulse-width ratio P, the states Z3 and Z4 may also occur. This leads to a stronger deceleration of the DC motor M and consequently a decrease in the nominal speed and torque.

With this control system it is possible to limit the speed and the effective torque to predetermined values by varying the pulse-width modulation of the control signal and by respectively adapting the switching period duration T and the switching period frequency, even in instances in which a relatively powerful DC motor is used for intensely accelerating the shifting elements so as to achieve short shifting times. The shifting times of a shifting mechanism can be minimized and the actuating speeds of the shifting mechanism can be optimized in accordance with the stress limits of the mechanical elements of the shifting mechanism in this way. A switching period frequency of 500 Hz is particularly practical for controlling the transistors when using a control system according to the invention in an automatic transmission.

Figure 3:
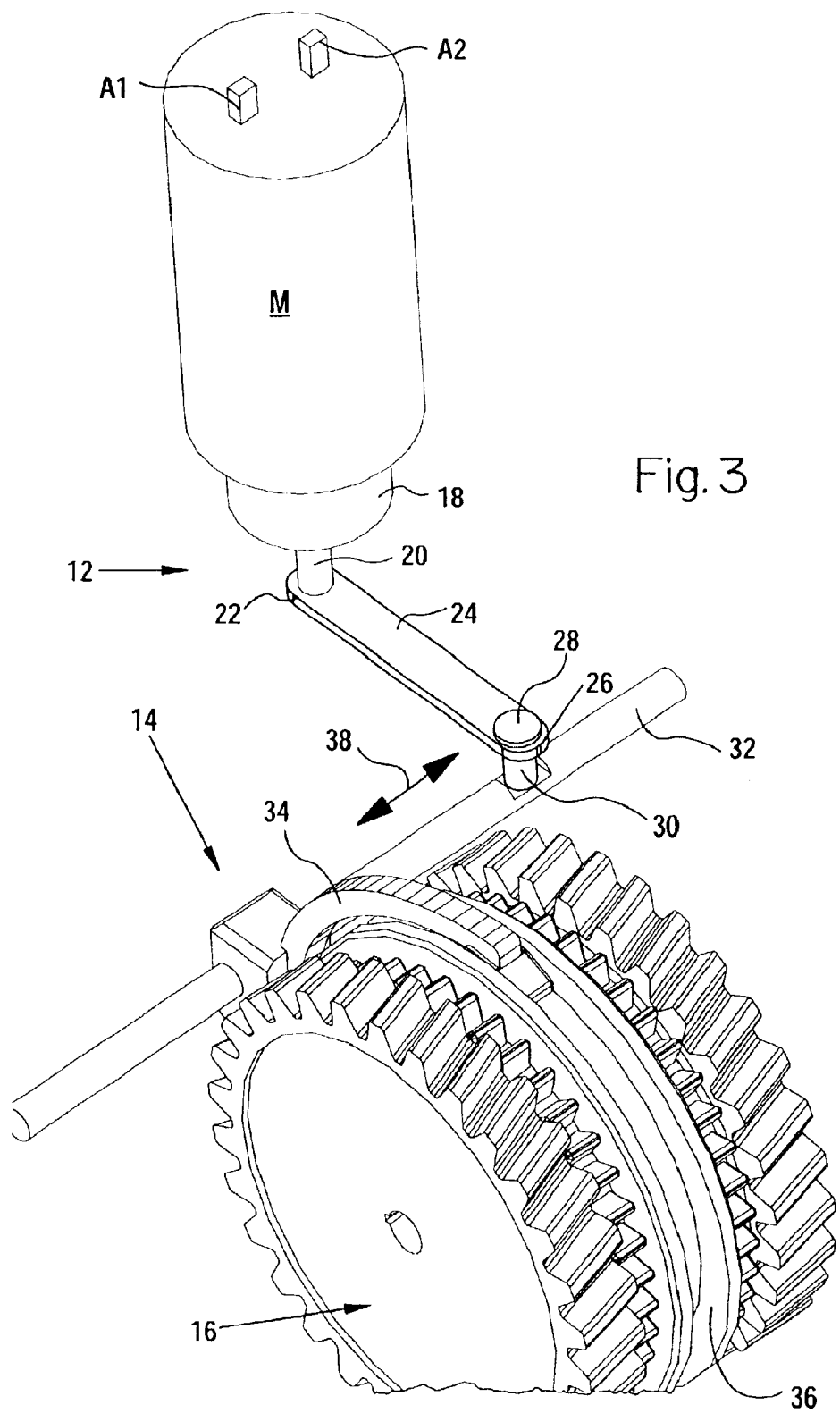
FIG. 3 is simplified perspective view of a transmission shifting mechanism operated by the DC motor of FIG. 1.

Referring now to FIG. 3, the motor M is coupled to a shifting mechanism 12. The shifting mechanism preferably has short shifting times because a prolonged operating interval of the DC motor could lead to overheating, in particular, in the short-circuit mode. (In an automatic transmission, the operating intervals are relatively short so that overheating of the DC motor is unlikely). The shifting mechanism 12 shifts a shifting unit 14 of a synchronizing device 16 of an automated manual shift transmission (not shown). The shifting mechanism 12 includes a step-down gear 18 which couples the motor M to an output shaft 20. The motor terminals A1, A2 are electrically connected to the control system 10 of FIG. 1. The output shaft 20 is connected to one end 22 of a lever 24 without rotational play. The lever 24 engages with an adjusting nut 30 of the shifting unit 14 by means of an adjusting pin 28 mounted on the second end 26 of the lever 24.

The shifting unit 14 includes a shifting rod 32 that is rigidly connected to a shifting fork 34. The adjusting nut 30, into which the adjusting pin 28 is inserted, is mounted on the shifting rod 32. The shifting fork 34 engages with a shifting sleeve 36 of the synchronizing device 16 of the manual transmission.

The synchronizing device 16 is preferably a conventional commercially available "Borg-Warner" synchronizer, such as is widely used in automobile transmissions. A detailed description of the design and the function of such a synchronizing device 16 and the synchronization achieved therewith can be found, for example, in G. Lechner and H. Naunheimer: "Automobile Transmissions," Springer Publishing House, Berlin-Heidelberg-New York, 1994, pp. 238–241.

The DC motor M is controlled by the control system 10 of FIG. 1. The step-down gear 18 delivers torque that engages the lever 24 via the output shaft 20. Due to the rotational movement of the output shaft 20, the second end 26 of the lever 24 carries out a pivoting movement. The pivoting movement is transmitted onto the shifting rod 32 via the adjusting pin 28 and the adjusting nut 30, so that the shifting rod 32 moves in the directions of the double arrow 38. Depending on the direction of rotation of the DC motor M, the shifting rod 32 is displaced into one of the directions indicated by the double arrow 38. The movement of rod 32 is transmitted onto the shifting sleeve 36 via the shifting fork 34 that is connected without rotational play to the shifting rod 32 and engages into the shifting sleeve 36. Synchronizing processes are initiated in the synchronizing device 16 in order to shift the gears of the transmission as a function of the shifting movement of the shifting sleeve 36.

The shifting movement may be varied with respect to the shifting force and the shifting speed during a shifting process, since a synchronizing process will comprise several synchronizing segments that require a different optimization of the shifting movement with respect to the shifting force and the shifting speed. Such an optimization of the shifting movement can be achieved by controlling the DC motor M with the control system 10 which varies the pulse-width ratio P.

Figure 4:
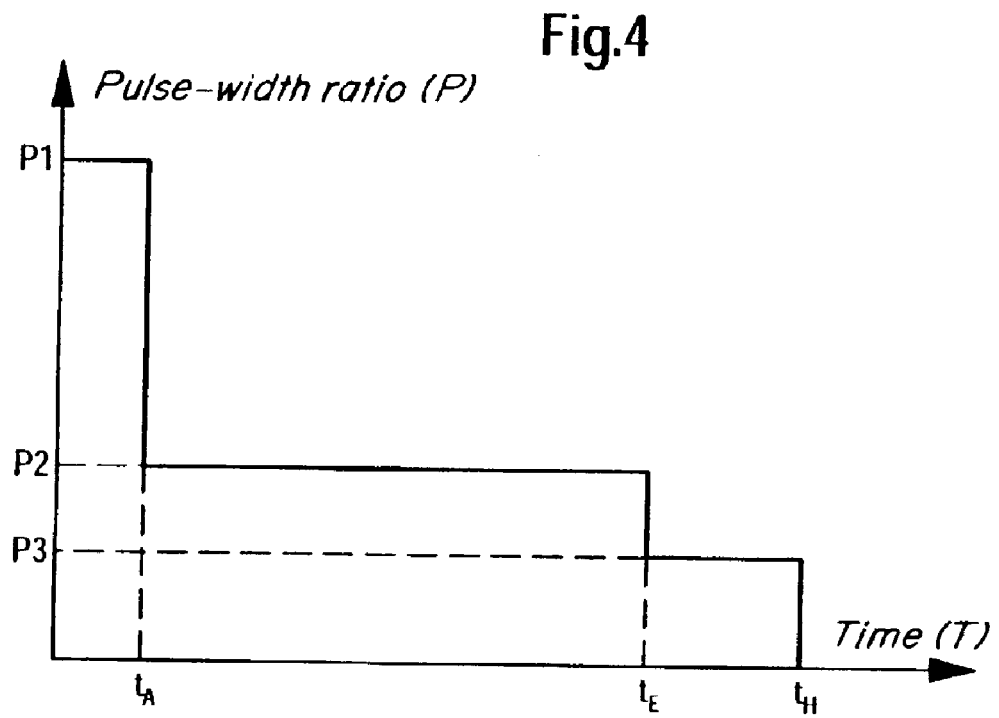
FIG. 4 is a signal timing diagram of a preferred pulse-width ratio of a control signal during a shifting process in an automatic transmission.

The timing diagram of FIG. 4 qualitatively describes a preferred variant of the pulse-width ratio P for the synchronizing process. At the beginning of a shifting process, a high constant pulse-width ratio P1 is chosen such that high acceleration forces are achieved and the static friction of the shifting sleeve 36 can be overcome. During a synchronizing process, predetermined synchronizing forces must be observed so as to prevent damage to the components of the synchronizing device. Consequently, the pulse-width ratio P1 is reduced to a constant pulse-width ratio P2 after a predetermined acceleration time tA. This also makes it possible to prevent an excessively high shifting speed when the shifting sleeve 36 reaches one of its end positions because this could lead to mechanical damage to the synchronizing device 16. After the synchronizing process is completed at the time tE, only low shifting forces are required for holding the shifting sleeve 36 in the end position so as to ensure that the shifted gear remains engaged until the shifting process is completed by engaging the clutch at the time tH. During this time, it is practical to maintain a supporting force on the shifting sleeve 36 and to maintain the pulse-width ratio P at a predetermined value P3. Thus, the shifting times can be minimized and the shifting speed optimized in accordance with the stress limits of the mechanical elements of the shifting mechanism 12, the shifting unit 14 and the synchronizing device 16 by varying the pulse-width ratios (P1, P2, P3) accordingly during a shifting process.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A control system for controlling a DC motor having a pair of terminals, the control system having a switch circuit having a plurality of switches for connecting the terminals to a power supply in response to pulse-width-modulated control signal, characterized by:

the motor driving a shifting mechanism, the shifting mechanism having a limited shifting path, and the shifting mechanism is part of a shifting unit of an automatic manual transmission, and the shifting path is limited by a synchronizing device of the shifting unit; and the switch circuit, without current sensors, during a control period, alternately connects the terminals to the power supply during a supply mode and short-circuits the terminals during a short-circuit mode, wherein the alternating supply and short-circuit modes result in operating states wherein the motor is alternately driven and decelerated.

2. The control system of claim 1, characterized by:

the motor is operated in an open mode manner during a time interval between the supply mode and the short-circuit mode, so that the switches of the switch circuit are simultaneously switched to a non-conductive state.

3. The control system of claim 1, wherein:

the switches comprise transistors.

4. The control system of claim 1, wherein:

the switches comprise transistors with diodes connected in parallel therewith.

5. The control system of claim 1, wherein the switch circuit comprises:

first and second transistors and corresponding first and second diodes, each diode having a cathode connected to an emitter of the corresponding transistor and having an anode connected to a collector of the corresponding transistor, the first transistor switchably connecting a first terminal of the power supply to a first terminal of the motor when the first transistor conducts current to the motor, a second terminal of the motor being connected to a second terminal of the power supply, and the second transistor switchably connecting the first terminal of the motor to the second terminal of the motor when the second transistor conducts current to the second terminal of the power supply.

6. The control system of claim 1, wherein the switch circuit comprises:

four transistors and four diodes, each diode having a cathode connected to an emitter of the corresponding transistor and having an anode connected to a collector of the corresponding transistor, the first and second transistors switchably connecting a first terminal of the power supply to first and second terminals of the motor, and the third and fourth transistors switchably connecting the first and second terminals of the motor, respectively, to the second terminal of the power supply, wherein the transistors conduction current in the same direction relative to the power supply.

7. The control system of claim 1, wherein:

the switch circuit can be controlled by a control signal having a pulse-width ratio which varies over time during the operation of the motor.

* * * * *